United States Patent Office.

JOHN W. HYATT, JR., OF ALBANY, NEW YORK.

*Letters Patent No. 76,765, dated April 14, 1868.*

IMPROVEMENT IN COMPOSITIONS FOR BILLIARD-BALLS AND OTHER ARTICLES.

*The Schedule referred to in these Letters Patent and making part of the same.*

TO ALL WHOM IT MAY CONCERN:

Be it known that I, JOHN W. HYATT, Jr., of the city and county of Albany, and State of New York, have invented a new and improved Process for Manufacturing Billiard-Balls and other Articles; and I do hereby declare that the following is a full and exact description thereof.

The nature of my invention consists in the manner in which I produce a composition for the manufacture of billiard-balls and other like articles.

My improved process is as follows: First, I take paper-pulp, thoroughly saturated with water, so that it is in a semi-fluid condition. While in this condition I mix with it the flour of gum-shellac, or any other similar fusible water-proof gum, by thoroughly stirring them together. The proportions of the gum to the paper-pulp are about equal in quantity by weight in a dry state. When thoroughly mixed, the next step in the process is to separate the water from the composition by pressure, applied in any suitable or convenient manner, but so as to bring the composition nearly into the shape or form desired. The composition is next placed in a die or mould heated sufficiently to cause the gum to melt or fuse, so as to cement perfectly the fibres of the pulp together. While in this melted or fused state, the composition is subjected to a high degree of pressure, sufficient to make the composition solid, and is allowed to cool under such pressure. The specific gravity of the composition may be adjusted by the addition of white lead, or any suitable pigment, to the gum, &c.

To color the composition, the pulp may be colored as desired before use, or aniline red, or other coloring-matter which will dissolve in alcohol, may be used by dissolving the same, and immersing the ball or other article in the solution until the desired color is obtained; or, the pigment, thus prepared, may be applied with a brush. In this manner a billiard-ball, or other similar article, may be prepared, having the necessary hardness, elasticity, durability, and finish of the common ivory ball.

To form this composition, I reduce to a fine dust or powder the gum, or other cementing-substance used, to enable me to mix the same most thoroughly with the paper-pulp, as any other method of admixture will not answer the purpose so well. To manufacture a perfect article, it is essential that the fibres of the pulp should be most completely cemented together. By pulverizing the gum, as above described, I am enabled to produce a perfect admixture of the gum and pulp, and to produce the desired result.

Having thus described my said improvement, by which I produce a composition billiard-ball, I will proceed to state my claim.

I do not claim the simple admixture of gum-shellac and paper-pulp, for the purpose of producing a composition, or the simple admixture of any other similar gum with paper-pulp, but What I do claim as my invention, and what I desire to secure by Letters Patent, is—

1. My improved method of producing such mixture by first pulverizing the gum, as above described, and then mixing the same with paper-pulp, in the manner and for the purpose above described.

2. I claim the billiard-ball, or other article of manufacture, produced from such composition, substantially in the manner and for the purpose above described.

JOHN W. HYATT, JR.

Witnesses:
  JOEL TIFFANY,
  WILLIAM STORE.